Jan. 14, 1969  W. D. JEFFERS  3,421,249

FISHHOOK

Filed May 11, 1966

INVENTOR.
WILLIAM D. JEFFERS
BY
Townsend and Townsend
ATTORNEYS

United States Patent Office 3,421,249
Patented Jan. 14, 1969

3,421,249
FISHHOOK
William D. Jeffers, Fresno, Calif., assignor to
Jeffers & Bailey, Inc., Fresno, Calif.
Filed May 11, 1966, Ser. No. 549,409
U.S. Cl. 43—42.37                                5 Claims
Int. Cl. A01k 85/00

ABSTRACT OF THE DISCLOSURE

In combination with a molded thermosetting plastic fish-shaped lure body, a fishhook including a pair of shanks arranged generally parallel to each other and defining therebetween a line-attaching eye, one of the shanks being integral with a hook and the other of the shanks being integral with an apertured lateral projection suitable for enclosure within the thermosetting plastic body.

---

This invention relates to an improved fishhook for enclosure within a molded plastic lure body which simulates the appearance of lower forms of animal life such as crustaceans, grubs or insects.

Various lures have heretofore been fabricated by molding synthetic, resinous materials, such as thermo-setting plastics, around a fishhook; see, for example, U.S. Patent No. 2,718,668, issued Sept. 27, 1955. However, such conventional devices have the disadvantage that the shank of the fishhook, formed with a smooth uninterrupted outer surface, does not remain permanently bonded to the lure body. When force is applied to the shank through either the hook or line-attaching eye and the lure body is twisted and turned during usage, for example, when a fish strikes, the shank tends to break away from the adjacent plastic surface and the hook will then be loosely held within the molded body. This destruction of the shank-plastic body bond adversely affects the performance of the lure during subsequent use as well as detracting from the resulting physical appearance of the lure.

It is, therefore, a principal object of this invention to provide a fishhook having a shank which will enhance the secureness of the disposition of the hook within a plastic lure body molded or formed around it.

It is a further object of this invention to provide a fishhook having a shank which will maintain a rigid bond to the adjacent surface of a plastic lure body even during extensive active usage.

It is a further object to provide a fish lure having a unitary body of resilient material integral with the shank of a fishhook which is prevented from movement independent of the unitary body by the structural configuration of the shank.

It is a feature and advantage of this invention to provide a fishhook including a shank which has at least one projection rigidly attached thereto and projecting transversely of the direction of propelling force, such as applied during casting or trolling with the lure. Such an extension also assists in positioning the shank within a molded plastic lure body. By employing this modified hook in a conventional molding operation wherein the lure body is formed by disposing, for example, thermo-setting plastic around the shank of the fishhook, an intimate bond will be produced between the lateral projections and the resulting lure body which will substantially increase the bond normally produced between the shank and the lure body.

It is a further feature and advantage of this invention to provide a fishhook having a shank which is bent over upon itself so that when the shank is disposed within the moldable plastic which forms the body of the fish lure, the conventional line-attaching eye is positioned within the plastic body. Thus the plastic occupies the space surrounding the shank and, in addition, completely encircles and fills in the line-attaching eye so that when the plastic is cured, a firm intimate bond is produced between the displaced eye and lure body which prevents the shank of the fishhook from breaking away from the plastic body of the lure.

These objects, features and advantages will be better understood and others will become apparent from the following description of the invention, especially when reference is made to the accompanying drawing, wherein.

Figure 1:
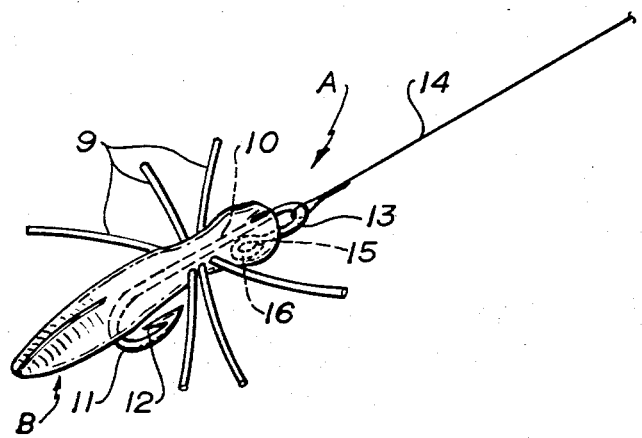
FIG. 1 is a perspective view illustrating one embodiment of a hook of the present invention within a molded lure body.
Figure 2:
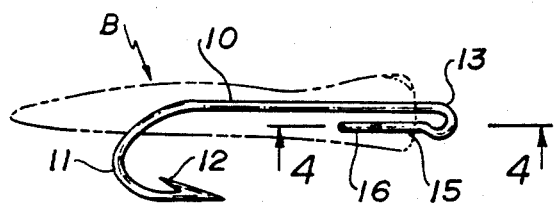
FIG. 2 is a side elevational view illustrating the hook configuration of the embodiment of FIG. 1.
Figure 3:
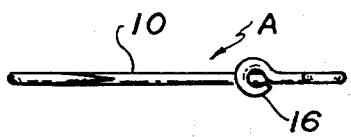
FIG. 3 is a bottom view of the fishhook of FIG. 2.
Figure 4:
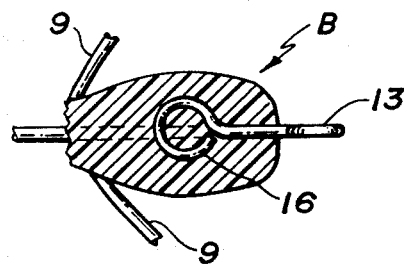
FIG. 4 is a partial sectional view taken along the line 4–4 of FIG. 2.

Referring now to the drawing in which similar characters of reference represent corresponding parts in each of the several views, there is a fishhook A having molded therearound an insect-shaped plastic body B having simulated legs 9.

Fishhook A includes a shank 10 having at one end thereof a return bend 11 terminating in a barb 12 and providing a conventional type of fishhook. The opposite end of shank 10 is bent upon itself to provide an eye 13 for attaching fishing line 14. The rod or other stock from which the shank is formed is provided with an extension including a shorter shank portion 15 along one side and in close proximity to the adjacent part of shank 10. The free end of shank 10 is provided with an apertured lateral projection shown in the drawing by way of example as conventional line-attaching eye 16.

Fishhook A can either be initially fabricated in this configuration, or a conventional fishhook can be modified by bending the fishhook upon itself along the shank at a distance from return bend 11. It will be apparent to one skilled in this art that the bent-over portion can be located, relative to the barbed portion of the return bend 11, either above or below the main portion of the shank and that it can be either of greater length or shorter than shank 10. Depending upon the desired position of the lateral extension with reference to bend 11, shank 10 of a conventional fishhook can be bent upon itself at any desired intermediate point. Thus, the return bend 11 and barb 12 could be positioned at an intermediate point along body B between apertured lateral projection 16 and eye 13. It is preferable to provide the bend about three-fourths of the way along shank 10 from bend 11 so that lateral projection 16 will be positioned between eye 13 and bend 11 as illustrated.

The formation of the lure can be accomplished by positioning fishhook A in a mold and then filling the mold with thermo-setting plastic which is allowed to cure. This conventional fabrication is illustrated in U.S. Patent No. 2,718,668, supra. The resulting plastic lure body B will be firmly bonded to the double shanked hook and line-attaching eye, the firm bond being the result of the plastic completely surrounding and extending through eye 16.

What is claimed is:

1. A fishhook for inclusion in a molded plastic fish lure body comprising: a hook member; a first shank portion integral at one end with said hook member; a line-attaching eye formed at the other end of said first shank portion; a second shank portion integral at one end with said line-attaching eye and arranged adjacent a portion of one side of said first shank; and an apertured lateral projection at the other end of said second shank portion whereby when thermosetting plastic is poured around said shanks and surrounding and extending through said apertured lateral projection and cured to form said fish lure body said fishhook will be securely bonded to said body.

2. A fishhook in accordance with claim 1 wherein said first and second shank portions are disposed in substantially parallel planes to each other.

3. A fishhook in accordance with claim 1 wherein said second shank portion is shorter than said first shank portion.

4. A method of preparing a fish lure including a plastic body molded about a fishhook comprising: providing a fishhook having a shank and an apertured lateral projection; bending said shank to form a first extension, including said apertured lateral projection; positioning said first extension parallel with the remaining portion of said shank, whereby said first extension and said remaining shank portion form a line-attaching eye; forming a lure body of thermosetting plastic material around said bent hook portion and extending through said apertured lateral projection; and allowing said plastic to cure whereby said lure body will be securely bonded to said fishhook through said plastic encircling said apertured lateral projection.

5. A fishhook in accordance with claim 1 wherein said apertured lateral projection defines a complete loop.

References Cited

UNITED STATES PATENTS

| | | | |
|---|---|---|---|
| 1,295,370 | 2/1919 | Porter | 43—42.37 X |
| 1,557,083 | 10/1925 | Peckinpaugh | 43—42.53 X |
| 2,518,487 | 8/1950 | Metz | 43—42.37 X |
| 2,540,716 | 2/1951 | Deimler | 43—42.53 X |
| 2,596,457 | 5/1952 | Wulff | 43—42.53 |
| 2,643,418 | 6/1953 | Auldridge. | |

SAMUEL KOREN, *Primary Examiner.*

D. J. LEACH, *Assistant Examiner.*

U.S. Cl. X.R.

43—42.53